United States Patent
Kasai et al.

(10) Patent No.: US 6,503,431 B1
(45) Date of Patent: Jan. 7, 2003

(54) PROCESS FOR MANUFACTURING AN EXTRUDED ARTICLE AND AN EXTRUDED ARTICLE

(75) Inventors: Tetsuji Kasai, Kuga-gun (JP); Mamoru Takahashi, Kuga-gun (JP); Takashi Nakagawa, Kuga-gun (JP); Satoshi Akiyama, Ichihara (JP)

(73) Assignee: Mitsui Chemicals Inc, Tokyo (JP)

( * ) Notice: Subject to any disclaimer, the term of this patent is extended or adjusted under 35 U.S.C. 154(b) by 0 days.

(21) Appl. No.: 09/343,049

(22) Filed: Jun. 30, 1999

(30) Foreign Application Priority Data

Jul. 8, 1998 (JP) .......................................... 10-193395

(51) Int. Cl.⁷ .............................................. B29C 47/00
(52) U.S. Cl. .............................. 264/171.13; 264/177.2; 264/211
(58) Field of Search ....................... 264/171.13, 172.19, 264/177.2, 211, 129; 427/420

(56) References Cited

U.S. PATENT DOCUMENTS

| | | | |
|---|---|---|---|
| 4,268,337 A | * 5/1981 | Ibata et al. | ............ 156/244.17 |
| 4,353,817 A | * 10/1982 | Nakae et al. | ................ 524/232 |
| 4,704,423 A | * 11/1987 | Iwanami et al. | ............ 524/417 |
| 5,158,992 A | 10/1992 | Caselli et al. | |
| 5,338,790 A | 8/1994 | Chatterjee | |
| 5,344,715 A | * 9/1994 | Negi et al. | .................. 428/520 |
| 5,401,562 A | * 3/1995 | Akao | ......................... 428/211 |
| 5,650,464 A | 7/1997 | Brunner et al. | |
| 5,707,569 A | * 1/1998 | Priester et al. | ................. 264/39 |
| 5,773,631 A | 6/1998 | Nesvadba et al. | |
| 5,783,638 A | 7/1998 | Lai et al. | |
| 5,981,048 A | * 11/1999 | Sugimoto et al. | ........... 428/216 |
| 6,033,749 A | * 3/2000 | Hata et al. | .................. 428/36.7 |
| 6,080,534 A | * 6/2000 | Aylward et al. | ............ 430/512 |

FOREIGN PATENT DOCUMENTS

| | | |
|---|---|---|
| GB | 2252324 | 8/1992 |
| JP | 6477053 | 3/1989 |
| JP | 275641 | 3/1990 |
| JP | 741571 | 2/1995 |
| JP | 747638 | 2/1995 |
| WO | 9406831 | 3/1994 |
| WO | 9519391 | 7/1995 |

OTHER PUBLICATIONS

Concise Encyclopedia of Polymer Science and Engineering, J. Kroschwitz, ed., John Wiley & Sons, 1990, pp. 350–356.*
Japanese Laid–open Patent Application HEI 8–283280 [JP08283280 (1996) ].
Japanese Laid–open Patent Application HEI 5–214175 [JP05214175 (1993) ].
Japanese Laid–open Patent Application HEI 5–214176 [JP05214176 (1993) ].
Japanese Laid–open Patent Application HEI 5–214177 [JP05214177 (1993) ].
Japanese Laid–open Patent Application HEI 6–234170 [JP05234170 (1994) ].
Japanese Laid–open Patent Application SHO 64–543 [JP64000543 (1989) ].

* cited by examiner

Primary Examiner—Mark Eashoo
(74) Attorney, Agent, or Firm—Sherman & Shalloway

(57) ABSTRACT

The present invention provides a process for manufacturing an molded article that involves the occurrence of reduced number of gels and less corrosion of the molding equipment in high-temperature molding, particularly extrusion molding onto such substrate as paper; an extruded article; and an olefin polymer composition suitable therefor.

The olefin polymer composition comprises an olefin polymer containing 5 to 200 ppm of aluminum, as aluminum atom, 0 to not more than 1,000 ppm of a phenolic stabilizer and 50 to 2,000 ppm of a phosphoric stabilizer.

4 Claims, No Drawings

PROCESS FOR MANUFACTURING AN EXTRUDED ARTICLE AND AN EXTRUDED ARTICLE

TECHNICAL FIELD

The present invention relates to a process for manufacturing an extruded article having smaller amount of gels when it is formed at high temperature, an extruded article and an olefin polymer composition suitable therefor.

TECHNICAL BACKGROUND

Polyolefins represented by high density polyethylene and linear low density polyethylene have been used for a broad range of applications such as injection moldings and extrusion moldings up to the present. For example, it is a widespread practice to extrude melted polyethylene and coat it onto a substrate such as paper, cardboard and cellophane by making use of film formability of polyethylene. Food containers, packaging materials, and resin-coated papers such as release papers printing paper and photographic substrates, which use polyethylene in such manner, are well-known.

The extrusion of an ethylene polymer is normally conducted at a temperature higher than its melting point (for example, the melting point of low density polyethylene: approximately 100° C. to 120° C.; the melting point of high density polyethylene; approximately 120° C. to 135° C.). However, the extrusion of polyethylene is usually carried out at a relatively low temperature of 230° C. (Refer to Polyethylene Synthetic Resin Technology Vol. 5, p 193, published by Seibundo Shinkosha, 1960). Especially in the case of extrusion-coating a melted ethylene polymer onto a substrate such as paper, the melt extrusion of the ethylene polymer by the T-die extrusion method has to be carried out at a temperature considerably higher than its melting point, for example, in the vicinity of 300° C., because the thin film coating is applied. The temperature in the vicinity of 300° C. for extrusion-coating such ethylene polymer is appropriate from a viewpoint of properness for processing. From the viewpoint of molecules, however, the temperature is in the range that accelerates activation of the molecules. Therefore, in an actual long processing run, such temperature gives rise to a condition in which radicals are readily formed in the neighborhood of the unsaturated bonds and side-chain carbons in the molecules due to such factor as a change in the flow of the melted ethylene polymer. As a consequence, such radicals often undergo chain reactions to cause cross-linking with the result that defects in the form of gels often appear in the extruded film. It is reported (Japanese Laid-Open Patent Publication HEI 6-255040) that these gels become protrusions on the resin-coated surface of paper, marring the appearance of the paper and causing various functional troubles.

It is pointed out in the aforementioned Japanese Laid-Open Patent Publication that the existence of gels in the resin layer of food containers, printing paper, etc. presents a problem because poor printing or peeling due to inadequate adhesion with the substrate will occur in the location of the gels, and that with release paper, the existence of gels will cause quality trouble in the process of coating a release agent such as silicone on to the resin layer in many cases.

Particularly, in the case of photographic substrates, the necessity for measures to prevent gels has been pointed out as an issue to be addressed on the ground that the existence of gels themselves causes a decline in the quality of the picture image and a loss of the commercial value of the product as photographic paper due to the inability to form a picture image by reason of the trouble occurring at the time of the application of the emulsion.

For example, a method for preventing such gels by performing operations by lowering extrusion temperature is proposed in Japanese Laid-Open Patent Publication SHO 64-543. However, this method presented the problem of a decline in adhesion with polyolefin.

SUMMARY OF THE INVENTION

The inventors found the new challenge of minimizing the occurrence of gels in molding at high temperature was difficult to predict on the basis of past knowledge. After working on the solution of the challenge, the inventors successfully made the present invention.

Discovering that it is important for obtaining an olefin polymer composition involving a smaller amount of gels in high-temperature molding, to combine the content of aluminum and a stabilizer, the inventors arrived at the present invention.

The present invention provides a process for manufacturing a molded article that involves the occurrence of reduced number of gels and less corrosion of the molding equipment in high-temperature molding, particularly extrusion molding; an extruded article; and an olefin polymer composition suitable therefor. The present invention is an excellent invention that can reduce the occurrence of gels to a lower level in a long continuous molding run even in the case of extrusion-coating an ethylene polymer especially onto such substrate as paper.

The present invention provides an olefin polymer composition comprising an olefin polymer containing 5 to 200 ppm of aluminum, as aluminum atom, 0 to not more than 1,000 ppm of a phenolic stabilizer and 50 to 2,000 ppm of a phosphoric stabilizer as the aforementioned olefin polymer composition that is suitable for high-temperature molding.

Furthermore, the present invention provides a process for manufacturing an extruded article obtained by extruding this olefin polymer composition at a temperature of 260° C. to 360° C.

Other specific embodiments of the present invention will be apparent from the following description.

DETAILED DESCRIPTION OF THE INVENTION

Olefin Polymer

Examples of the olefin polymer of the present invention include homopolymers of a-olefins having 2 to 4 carbon atoms such as ethylene, propylene and butene-1 and copolymers of the aforementioned olefins and at least one comonomer, Examples of comonomer include a-olefin having 2 to 20, preferably 2 to 8 carbons, such as ethylene, propylene, butene-1 pentene-1 pentene-1, hexene-1,4-methylpentene-1 and octene-1. The comonomer is preferably contained in an amount of not more than 30 mol % preferably not more than 10 mol %, against the copolymer.

The MFR of the olefin polymer is preferably 1 to 50 g/10 minutes (ASTM D 1238, 190° C., 2.16 kg), more preferably 10 to 50 g/10 minutes, and much more preferably 10 to 30 g/10 minutes.

Polyethylene is preferable as the olefin polymer. In the present invention, polyethylene is a term which includes the homopolymers and copolymers of ethylene. For polyethylene, high density polyethylene, medium density polyethylene, linear low density polyethylene (LLDPE), etc. are used preferably. As polyethylene, a homopolymer of ethylene is especially preferable.

The olefin polymer may be manufactured by the process already known. Out of the olefin polymers, polyethylene may be manufactured by the catalysts already known to the public, including Ziegler type catalysts such as solid titanium catalysts, vanadium catalysts and metallocene catalysts.

The density of polyethylene is preferably 0.88 to 0.97 g/cm³, more preferably 0.91 to 0.97 g/cm³.

Aluminum

The olefin polymer may contain aluminum derived from the various components used in the manufacturing process, such as a catalyst component. For example, aluminum may be contained in the olefin polymer due to the catalyst residues occurring at the time of the manufacture of the olefin polymer. Aluminum may also be contained due to the additives used after the manufacture of the olefin polymer. The inorganic salt that is used as the additive to be added to prevent the corrosion of the equipment may also contain aluminum in some cases, For example, it is known (Japanese Published Patent Publication SHO 57-19133) that an inorganic salt containing aluminum or the like is used to prevent the corrosion of the equipment such as molding equipment that may take place due to catalyst residues.

The olefin polymer of the present invention contains 5 to 200 ppm of aluminum as an element. The form of the aluminum so contained does not matter. Aluminum is normally contained as a component element of a compound.

In the molding of the olefin polymer, an additive is used to prevent the corrosion of the equipment such as molding equipment. Use of an additive is recommended especially for the molding of the olefin polymer at high temperature. Preferred examples of such additive include inorganic salts of inorganic complex salts containing aluminum. For such preferable inorganic salt, inorganic salts having the following general formulas are used. Therefore, a part of or all of the aluminum contained in the olefin polymer composition of the present invention may be contained as an inorganic salt containing aluminum. As a preferable compound belonging to such inorganic salt containing aluminum, hydrotalcites may be cited. Examples of hydrotalcites include hydrotalcite group which are natural mineral salts, and synthetic hydrotalcites, such as, hydrotalcite and manaceite as cited below as examples. Particularly hydrotalcite is preferable, and synthetic hydrotalcite is more preferable.

(1) Hydrotalcite Group

Hydrated carbonate minerals represented by the following general formula;

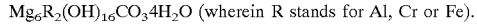

$Mg_6R_2(OH)_{16}CO_3 4H_2O$ (wherein R stands for Al, Cr or Fe).

Preferable examples include compounds in which R is Al in the formula, such as hydrotalcite and manaceite. and
(2) Synthetic Hydrotalcites Represented by the Following General Formula:

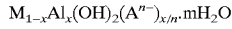

$M_{1-x}Al_x(OH)_2(A^{n-})_{x/n}\cdot mH_2O$ wherein M stands for a bivalent metal ion of Mg, Ca or Zn, $A^{n-}$ stands for an anion of n valency, such as, $Cl^-$, $Br^-$, $I^-$, $NO_3^{2-}$, $ClO_4^{2-}$, $SO_4^{2-}$, $CO_3^{2-}$, $SiO_3^{2-}$, $HPO_4^{2-}$, $HBO_3^{2-}$, and $PO_4^{2-}$, and x is a number satisfying $0<x<0.5$, and m is a number satisfying $0 \leq m \leq 2$.

The average particle size of these hydrotalcite compounds is not limited in any particular way but has only to be within such range that will not have any adverse effect on film appearance, strength, elongation or moldability. However, the average particle size of the compounds is normally not more than 10μ, preferably not more than 5μ, more preferably not more than 3μ.

From the viewpoint of preventing the corrosion of the equipment, aluminum is preferably contained in the olefin polymer in an amount of 5 to 200 ppm, preferably 8 to 150 ppm, more preferably 15 to 150 ppm, against the olefin polymer. At least a part of or all of aluminum is preferably contained in the form of an inorganic salt such as hydrotalcite as mentioned above. The content of aluminum may be measured by the elemental analysis method.

Stabilizers

Phenolic Stabilizer

For the phenolic stabilizer, the phenolic stabilizer that has been used traditionally as a stabilizer is used without any particular restriction. Specific examples of the phenolic stabilizer include the following compounds: 2,6-di-t-butyl-4-methylphenol, 2,6-di-t-butyl-4-ethylphenol, 2,6-dicyclohexyl-4-methylphenol, 2,6-di-t-amyl-4-methylphenol, 2,6-di-t-octyl-4-n-propylphenol, 2,6-di-cyclohexyl-4-n-octylphenol, 2-isopropyl-4-methyl-6-t-butylphenol, 2-t-butyl-2-ethyl-6-t-octylphenol, 2-isobutyl-4-ethyl-6-t-hexylphenol, 2-cyclohexyl-4-n-butyl-6-isopropylphenol, dl-α-tocopherol, t-butyl hydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 4,4'-methylenebis(2,6-di-t-butylphenol), 2,2'-methylenebis [6-(1-methylcyclohexyl)-p-cresol], 2,2'-ethylidenebis(4,6-di-t-butylphenol), 2,2'-butylidenebis(2-t-butyl-4-methylphenol), 2-t-butyl-6-(3-t-butyl-2-hydroxy-5-methlbenzyl)-4-methylphenylacrylate, 2-[1-(2-hydroxy-3,5-di-t-pentylphenyl)ethyl]-4,6-di-t-pentylphenylacrylate, 1,1,3-tris (2-methyl-4-hydroxy-5-t-butylphenyl)butane, triethylene glycol-bis[3-(3-t-butyl-5-methyl-4-hydroxyphenyl) propionate], 1,6-hexanediol-bis[3-(3,5-di-t-butyl-4-hydroxyphenyl)propionate], 2,2-thiodiethylenebis[3-(3,5-di-t-butyl-4-hydroxyphenyl)propionate], N,N'-hexamethylenebis(3,5-di-t-butyl-4-hydroxy-hydrocinnamamide), 3,5-di-t-butyl-4-hydroxybenzylphosphonate-deiethylester, tris(2,6-dimethyl-3-hydroxy-4-t-butylbenzyl)isocyanurate, tris(3,5-di-t-butyl-4-hydroxybenzyl)isocyanurate, tris[(3,5-di-t-butyl-4-hydroxyphenyl)propionyloxyethyl]isocyamurate, tris(4-t-butyl-2,6-dimethyl-3-hydroxybenzyl)isocyanurate, 2,4-bis (n-octylthio)-6-(4-hydroxy-3,5-di-t-butylanilino)-1,3,5-triazine, tetrakis[methylene-3-(3,5-di-t-butyl-4-hydroxyphenyl)propionate]methane, 2,2'-methylenebis(4-methyl-6-t-butylphenol)terephthalate, 1,3,5-trimetyl-2,4,6-tris(3,5-di-t-butyl-4-hydroxybenzyl)benzene, 3,9-bis[1,1-dimethyl-2-{β-(3-t-butyl-4-hydroxy-5-methylphenyl) propionyloxy}ethyl]-2,4,8,10-tetraoxaspiro[5,5]undecane, 2,2-bis[4-(2-(3,5-di-t-butyl-4-hydroxyhydrocinnamoyloxy)) ethoxyphenyl]propane, β-(3,5-di-t-butyl-4-hydroxyphenyl) propionic stearate.

Among them, preferable compounds include 2,6-di-t-butyl-4-methylphenol, tetrakis[methylene-3-(3,5-di-t-butyl-4-hydroxyphenyl)propionate]methane, β-(3,5-di-t-butyl-4-hydroxyphenyl)propionic stearate, tris(3,5-di-t-butyl-4-hydroxybenzyl)isocyanurate, 1,3,5-trimethyl-2,4,6-tris(3,5-di-t-butyl-4-hydroxybenzyl)benzene, dl-α-tocopherol, tris (2,6-dimethyl-3-hydroxy-4-t-butylbenzyl)isocyanurate, tris

[(3,5-di-t-butyl-4-hydroxyphenyl)propionyloxyethyl] isocyanyrate, 3,9-bis[1,1-dimethyl-2-{β-(3-t-butyl-4-hydroxy-5-methylphenyl)propionyloxy}ethyl]-2,4,8,10-tetraoxaspiro[5,5]undecane. More preferably, 2,6-di-t-butyl-4-methylphenol and tetrakis(methylene-3-(3,5-di-t-butyl-4-hydroxyphenyl)propionate]methane are cited.

These phenolic stabilizers may be used singly or in combination with one another.

The content of the phenolic stabilizer is 0 to 1,000 ppm, preferably 0 to 800 ppm, against the olefin polymer. Especially preferable is the case where the content of phenolic stabilizer is zero. However, with the present invention, even if the phenolic stabilizer is contained in an amount of more than 0 to 1,000 ppm, preferably 50 to 800 ppm, the problem as described above can be solved by using a phosphoric stabilizer as described below, while retaining long-term heat resistance.

Phosphoric Stabilizer

For the phosphoric stabilizer, the phosphoric stabilizer that has been used traditionally as a stabilizer is used without any particular restriction. Specific examples of the phosphoric stabilizer include the following compounds:

Trioctylphosphite, trilaurylphosphite, tridecylphosphite, octyl-diphenylphosphite, tris(2,4-di-t-butylphenyl)phosphite, triphenylphosphite, tris(butoxyethyl)phosphite, tris(nonylphenyl)phosphite, di-stearylpentaerythritoldiphosphite, tetra(tridecyl)-1,1,3-tris(2-methyl-5-t-butyl-4-hydroxyphenyl)butanediphosphite, tetra(mixed alkyl groups having 12 to 15 carbon atoms)-4,4'-isopropylidenediphenyldiphoshite, tetra(tridecyl)-4,4'-butylidenebis(3-methyl-6-t-butylphenyl)diphosphite, tris(3,5-di-t-butyl-4-hydroxyphenyl)phosphite, tris(mono- and di-mixed nonyl phenyl)phosphite, hydrogenated 4,4'-isopropylidenediphenol polyphosphite, bis(octylphenyl)bis(4,4'-butylidenebis(3-methyl-6-t-butylphenol)]1,6-hexanedioldiphosphite, phenyl4,4'-isopropylidene phenol pentaerythritol-diphosphite, tris(4,4'-isopropylidenebis(2-t-butylphenyl)]phosphite, phenyl diisodecylphosphite, di(nonylphenyl)pentaerythritoldiphophite, tris(1,3-di-stearoyloxy isopropyl) phosphite, 4,4'-isopropylidenebis(2-t-butylphenol)di(nonylphenol)di(nonylphenyl)phosphite, 9,10-di-hydro-9-oxa-9-oxa-10-phosphophenanthrene-10-oxide, bis(2,4-di-t-butyl-6-methylphenyl)-ethylphosphite, 2-[{2,4,8,10-tetrakis (1,1-dimethylethyl)dibenzo(D,F)(1,3,2)-dioxaphosphephin-6-yl}oxy]-N,N-bis(2-[{2,4,8,10-tetrakis(1,1-dimethylethyl) dibenzo(D ,F)(1,3,2)-dioxaphosphephin-6yl}oxy]ethyl) ethaneamine, etc.

Bis(dialkylphenyl)pentaerythritoldiphosphiteester may be a spiro compound represented by the following general formula (I) or a cage compound represented by the following general formula (II) Usually a mixture of said two isomers is used due to the economical reason.

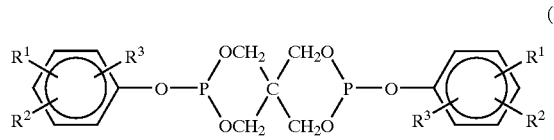
(I)

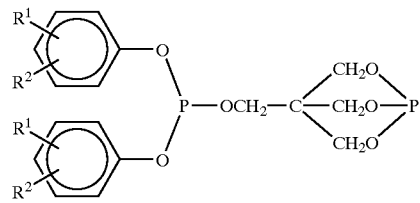
(II)

In the general formulas (I) and (II), $R^1$, $R^2$, $R^3$ stand for hydrogen atom, or alkyl group having 1 to 9 carbon atoms, preferably branched alkyl group, more preferably tert-butyl group, and preferable substitution positions in the phenyl groups are 2,4 and 6. Preferable examples of the phosphite esters include bis(2,4-di-t-butyl phenyl)pentaerythritol diphosphite, bis(2,6-di-t-butyl-4-methylphenyl) pentacrythritol diphosphite.

Furthermore phosphonites having the structure in which carbon and phosphorus are directly bonded such as tetrakis (2,4-di-t-butylphenyl)4,4'-biphenylenediphosphonite may be cited.

Out of these, a stabilizer containing trivalent phosphorus is preferable.

These phosphoric stabilizers may be used singly or in combination with one another.

The addition amount of the phosphoric stabilizer is 50 to 2,000 ppm, preferably 50 to 1,000 ppm, more preferably 50 to 600 ppm, much more preferably 50 to 300 ppm.

The total (X+Y) of the phenolic stabilizer content (X) and the phosphoric stabilizer content (Y) is normally not more than 1,000 ppm, preferably 50 to not more than 1,000 ppm, more preferably 50 to 600 ppm, much more preferably 50 to 300 ppm. Furthermore, the ratio (X/Y) of the phenolic stabilizer content (X) to the phosphoric stabilizer content (Y) is not less than 0 to not more than 3, preferably not more than 2, more preferably not more than 1.5, much more preferably not more than 1.1.

The olefin polymer composition of the present invention is a preferable composition if it satisfies both 50 ppm≦X+Y≦1,000 ppm and 0≦X/Y≦3. The values of X+Y and X/Y may be substituted by their respective more preferable values.

The total (Z+X+Y) of the aluminum content (Z), the phenolic stabilizer content (X) and the phosphoric stabilizer content (Y) is preferably not more than 2,000 ppm, more preferably 55 to 1,000 ppm, much more preferably 55 to 800 ppm, especially much more preferably 55 to 300 ppm.

The ratio [(X+Y)/Z] of the total of the phenolic stabilizer content (X) and the phosphoric stabilizer content (Y) to the aluminum content (Z) is preferably 0.1 to 10, more preferably 2 to 8, much more preferably 2 to 7.

If the contents of aluminum, phosphoric stabilizer and phenolic stabilizer are within the ranges as described above, more preferable results are obtained with respect to the effect of reducing the number of gels occurring in the high-temperature molding of the olefin polymer composition. Moreover, that makes possible the attainment of good appearance that is affected by the color of the product film and foreign matter. In addition, that will have much effect in improving the heat resistance, aging resistance and other stability of the olefin polymer and enable the cost of the stabilizers to be reduced to a low level.

An example of a preferable embodiment of the olefin polymer composition used in extrusion molding under the present invention is the following;

an olefin polymer composition containing:
- (A) 5 to 200 ppm of aluminum, as aluminum atom;
- (B) 0 to 1,000 ppm of a phenolic stabilizer; and
- (C) 50 to 2,000 ppm of a phosphoric stabilizer.

Furthermore, the aforementioned olefin polymer composition in which the phenolic stabilizer content (X) and the phosphoric stabilizer content (Y) are in the following relationship will produce good results:

50 ppm$\leq$X+Y$\leq$1,000 ppm

0$\leq$X/Y$\leq$3

In the aforementioned olefin polymer composition, the olefin polymer composition in which part or all of the aluminum is contained as an inorganic salt containing aluminum is another example of a preferable embodiment of the present invention.

Moreover, a more preferable example of the olefin polymer composition is an olefin polymer composition in which the inorganic salt containing salt is hydrotalcite.

In the aforementioned olefin polymer compositions, an olefin polymer composition wherein the olefin polymer has the MFR of 10 to 50 g/10 minutes is preferable. Furthermore, an olefin polymer composition wherein the olefin polymer is polyethylene is more preferable Moreover, an olefin polymer coinposition wherein polyethylene has the density of 0.88 to 0.97 is much more preferable.

All of the aforementioned olefin polymer compositions are olefin polymers suitable for use in extrusion molding.

Molding of the Olefin Polymer

The compositions of the present invention are suitable especially for extrusion molding. For example, it is suitable for film molding such as an inflation molding or a T die molding. It is also useful for lamination, particularly extrusion lamination including co-extrusion and extrusion coating, in which it is laminated onto another film or material.

Molding methods already known may be applied to the olefin polymer composition of the present invention. For example, it is possible to mix the olefin polymer, a phenolic stabilizer, phosphoric stabilizer and other additives, to knead, i.e., melt and blend, them and then to form pellets for molding by means of an extruder. The pellets will be supplied to molding equipment to form the molded articles as desired. In this process, a Henschel mixer may be used for the purpose of mixing, and a Banbury mixer, roll mill, kneader, etc. may be used selectively for the purpose of kneading.

There is no particular restriction on the order of mixing the stabilizers and the additives. They may be mixed all together or step by step. Molding equipment may be selected as a means of mixing.

The type of molding equipment is selected according to the molding method, and any desired molded article may be obtained by selecting the die at the outlet of the molding equipment.

There is no particular limit to the shape and type of the molded articles obtained from the composition of the present invention. However, sheets, films, pipes, hoses, and coatings such as paper coatings and wire and cable coatings may be cited as specific examples of the types of the aforementioned molded articles. The composition of the present invention is especially suitable for use for sheets, films and coatings.

For extrusion molding the aforementioned composition may be molded by use of extrusion equipment already known. For example, it is possible to conduct extrusion molding by extruding the previously melted olefin polymer composition through a T die or a ring die, using a single-screw extruder, kneading extruder, ram extruder and gear extruder.

Lamination

There are a number of lamination methods including (1) a method in which the composition of the present invention and a substrate such as a single or multi-layer film are laminated by extrusion, which includes co-extrusion and extrusion coating, (2) a method in which the composition of the present invention and a substrate such as a single or multi-layer film are laminated by dry lamination, (3) a method in which the composition of the present invention and a substrate such as a single or multi-layer film are laminated by heat fusion; and (4) a method in which the composition of the present invention and a substrate such as a single or multi-layer film are laminated by hot melt (hot melt lamination).

The composition of the present invention has the marked effect of making satisfactory adhesion possible without treating the surface of the film or resin when it is extrusion-laminated, for example co-extruded or extrusion-coated, at high temperature. The composition is especially suitable for extrusion coating.

Under the present invention, it is possible to obtain extrusion-coated articles bonded to the substrate in satisfactory condition by extrusion-coating the composition of the present invention onto the substrate.

The high temperature as used in the present invention refers to a temperature higher than the molding temperature traditionally employed, such as 260° C. to 360° C., preferably 280° C. to 360° C., more preferably 300° C. to 330° C. The molding temperature as used in the present invention refers to the resin temperature at the outlet of the die of the molding equipment.

Additives other than the ones mentioned above, such as ultraviolet absorbing agents, lubricants, slip agents, pigments, pigment dispersing agents, dyes, antistatic agents, anti-fogging agents, anti-blocking and fillers, may be added to the olefin polymer composition of the present invention to the extent that the purpose of the present invention is not thwarted.

As examples of the substrate used in the extrusion coating under the present invention, paper and cellophane are cited, out of which paper is especially preferable.

The extrusion-coated products of the present invention have lower number of gels in the resin part coated onto the substrate. Therefore, these extrusion-coated products are suitable for use in food containers, packaging materials, release paper, printing paper and photographic substrates and are especially preferable for use in photographic substrates.

The polyolefin composition of the present invention has excellent heat resistance, causes less corrosion of molding equipment, involves occurrence of lower number of gels, and consequently results in good appearance of products.

The polyolefin composition of the present invention is useful especially for extrusion molding.

EXAMPLES

In the following Examples and Comparative Examples are described a number of embodiments to illustrate the present invention. However, it is to be understood that the present invention is not be limited in any way by these Examples.

Example 1

Manufacture of Film 600 ppm of tris(2,4-di-t-butylphenyl)phosphite and 800 ppm of synthetic hydrotalcite (DHT-4A, available from Kyowa Chemical Industry Co.) were added to polyethylene homopolymer having the density of 0.970 and the MFR of 15 g/10 minutes, and they were mixed by use of a Henschel mixer. This mixture was kneaded in an extruder at the resin temperature of 210° C. and extruded to be turned into pellets. The aluminum content of the pellets thus obtained was measured by the elementary analysis method.

The T-die molding of these pellets was conducted by use of the following molding equipment and conditions so that the extrusion rate was 38 g/minute. The rotary speed of the cooling rolls was controlled so that the thickness of the film being formed would be 20 to 30 $\mu$m:

Molding Equipment:

Extruder: 20 mm Ø extruder available from Tanaka Tekko

Screw: Flight type, Dulmage type (L/D=26)

Die: Coathanger-type T-die available from Tanaka Ironworks (150 mm wide×1 mm die lip)

Molding conditions:

Set temperatures:

C1/C2/C3/H/A/D=180/250/320/320/320/320 (° C.)

Resin temperature: 310° C. to 315° C.

Screen mesh: 60/80/100/100/80/60

Screw rpm: 60 rpm (38 g/min., $\gamma$=33.3 sec$^{-1}$).

Determination of the Increasing Rate of Gel

In the course of the manufacture of the aforementioned film, a test sample 10 cm in width and 10 m in length in the take-up direction was taken from the film on the take-up roll after 5 minutes from the time of the melted resin flowing out of the T-die. The sample was checked visually, and the number of gels in the sample was counted with the gel-like areas in not less than 0.2 mm in 30 diameter taken as gels. These operations were carried out every five minutes eleven times in all from the time of the melted resin flowing out of the T-die to 55 minutes after that time The value obtained by the following formula was called the increasing rate of gel and used for comparative purposes:

Increasing rate of gel=

Total number of gels as counted by 11 times of counting/

Number of gels as counted after 5 minutes

The value of the rate becomes larger with those resins in which gels occur readily. The results are shown in Table 1.

Comparative Example 1

T-die molding was conducted in the same manner as described in Example 1 except that 300 ppm of tetrakis [methylene-3-(3,5-di-t-butyl-4-hydroxyphenyl)propionate] methane and 300 ppm of 2,6-di-t-butyl-4-miethylphenol were used against the polyethylene in place of 600 ppm of tris(2,4-di-t-butylphenyl)phosphite; and the increasing rate of gel was determined. The results are shown in Table 1.

Example 2

T-die molding was conducted in the same manner as described in Example 1 except that 300 ppm of 2,6-di-t-butyl4-methylphenol (available from Yoshitomi Phamaceutical Industries) and 300 ppm of tris(2,4-di-t-butylphenyl) phosphite were used against the polyethylene in place of 600 ppm of tris(2,4-di-t-butylphenyl)phosphite and that the amount of the synthetic hydrotalcite was 500 ppm; and the increasing rate of gel was determined. The results are shown in Table 1.

Example 3

200 ppm of tris(2,4-di-t-buylphenyl)phosphite and 500 ppm of synthetic hydrotalcite were added to polyethylene (ethylene homopolymer) having the density of 0.970 and the MFR of 15 g/10 minutes, and they were mixed by use of a Henschel mixer. This mixture was turned into pellets in the same manner as described in Example 1. The aluminum content of the pellets thus obtained was measured by the elementary analysis method.

The pellets obtained as described above were processed by T-die molding, and the increasing rate of gel was determined. The results are shown in Table 1.

Comparative Example 2

T-die molding was conducted in the same manner as described in Example 1 except that 200 ppm of 2,6-di-t-butyl-4-methylphenol was used against the polyethylene in place of 600 ppm of tris(2,4di-t-butylphenyl)phosphite and 500 ppm of synthetic hydrotaicite was used; and the increasing rate of gel was determined. The results are shown in Table 1.

Example 4

T-die molding was conducted in the same manner as described in 15 Example 3 except that ethylene/4-methyl-1-pentene copolymer having density of 0.92 and MFR of 20 g/10 min. was used in place of ethylene homopolymer and 500 ppm of synthetic hydrotalcite was used. The results are shown in Table 1.

Comparative Example 3

T-die molding was conducted in the same manner as described in Comparative Example 2 except that ethylene/ 4-methyl.1-pentene copolymer having density of 0.92 and MFR of 20 g/10 min. was used in place of ethylene homopolymer and 500 ppm of synthetic hydrotalcite was used. The results are shown in Table 1.

Example 5

T-die molding was conducted in the same manner as described in Example 3 except that ethylene/butene-1 copolymer having density of 0.89 and MFR of 20 g/10 min. was used in place of ethylene homopolyner and 500 ppm of synthetic hydrotalcite was used. The results are shown in Table 1.

Comparative Example 4

T-die molding was conducted in the same manner as described in Comparative Example 2 except that ethylene/ butene-1 copolymer having density of 0.89 and MFR of 20g/10 min. was used in place of ethylene homopolymer and 500 ppm of synthetic hydrotalcite was used. The results are shown in Table 1.

TABLE 1

|  | Example 1 | Comparative Example 1 | Example 2 | Example 3 | Comparative Example 2 | Example 4 | Comparative Example 3 | Example 5 | Comparative Example 4 |
|---|---|---|---|---|---|---|---|---|---|
| PE | | | | | | | | | |
| Dencity (g/m³) | 0.97 | 0.97 | 0.97 | 0.97 | 0.97 | 0.92 | 0.92 | 0.89 | 0.89 |
| MVR (g/10 min) | 15 | 15 | 15 | 15 | 15 | 20 | 20 | 20 | 20 |
| Al content (ppm) | 102 | 102 | 68 | 68 | 68 | 80 | 80 | 140 | 140 |
| Stablizer 1 (ppm) | 600 | | 300 | 200 | | 200 | | 200 | |
| Stablizer 2 (ppm) | | 300 | | | | | | | |
| Stablizer 3 (ppm) | | 300 | 300 | | 200 | | 200 | | 200 |
| Increasing rate of gel | 18 | 31 | 19 | 9 | 38 | 7 | 28 | 5 | 18 |

Stabilizer 1: Tris(2,4-di-t-butylphenyl)phosphite
Stabilizer 2: Tetrakis(methylene-3-(3,5-di-t-butyl-4-hydroxyphenyl)propionate)methane
Stabilizer 3: 2,6-di-t-butyl-4-methylphenol

What we claim is:

1. A process for manufacturing an extruded article of an olefin polymer composition, comprising the step of extruding an aluminum containing olefin polymer containing (A) 5 to 200 ppm of aluminum, as aluminum atom,
(B) 0 ppm of a phenolic stabilizer, and
(C) 50 to 2,000 ppm of a phosphoric stabilizer, at a temperature of 280° C. to 360° C.

2. The process for manufacturing an extruded article of claim 1, wherein the extruded article is an extrusion-coated article with a substrate.

3. The process for manufacturing an extruded article of claim 2, wherein the substrate is a paper.

4. The process for manufacturing an extruded article of claim 1, wherein part or all of the aluminum derives from hydrotalcites.

* * * * *